Patented Apr. 22, 1941

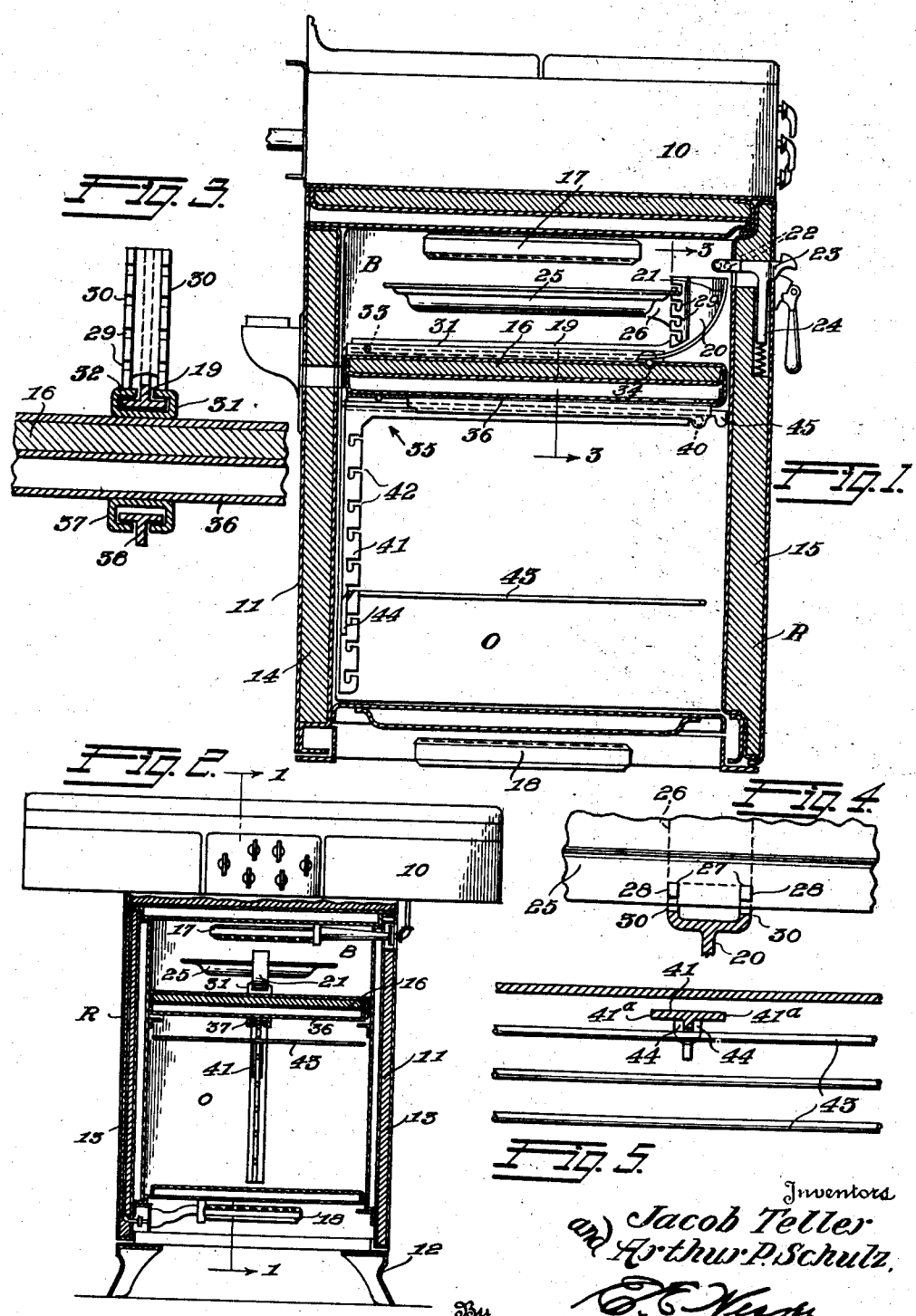

2,239,347

UNITED STATES PATENT OFFICE 2,239,347

GAS OR ELECTRIC COOKING APPARATUS

Jacob Teller, Chicago, Ill., and Arthur P. Schulz, Michigan City, Ind., assignors, by mesne assignments, to G. & J. Teller, Chicago, Ill., a partnership composed of Grace Teller and Jacob Teller Original application October 20, 1934, Serial No. 749,282. Divided and this application October 28, 1937, Serial No. 171,590

6 Claims. (Cl. 126—41)

This invention is a division of our application for Gas or electric cooking apparatus, Serial No. 749,282, filed October 20, 1934, now Patent No. 2,116,854, May 10, 1938, and relates generally to cooking vessel supports for gas or electric cooking ranges.

More specifically, the invention relates to cooking vessel supports disposed within the oven and broiler compartments of a cooking range and associated with the range structure in such manner that they are readily capable of being moved into and out of such compartments whereby greatly facilitating positioning and removing of the cooking vessels supported thereby.

The supports in accordance with a preferred embodiment of the invention are particularly adapted for movable connection with a horizontal partition defining a low oven compartment and a broiler compartment above the oven compartment, the supports being movably connected with opposite horizontal faces of the partition and the oven and broiler compartments being closed by a single door as is fully disclosed in the parent application above referred to.

A primary object of the invention is the provision of cooking vessel supports movably connected with a cooking range structure for horizontal movement into and out of compartments therein.

A further object of the invention is the provision of cooking vessel supports movably associated with a partition in a cooking range for horizontal movement into and out of oven and broiler compartments separated by the partition and which supports include novel means for vertically adjustably supporting the cooking vessels within the oven and broiler compartments.

A still further object of the invention is the provision of cooking vessel supports of the character hereinbefore referred to which are simple in construction, dependable in operation and which are capable of manufacture and assembly at relatively low cost.

With the above objects in view as well as others, that will become apparent in the course of the following disclosure, reference will now be made to the accompanying drawing forming part of same, and wherein Fig. 1 is a vertical section through a range, substantially on the line 1—1 of Fig. 2 and disclosing a preferred embodiment of the cooking vessel supports operatively associated therewith.

Fig. 2 is a vertical section of the range at right angles to the section shown in Figure 1.

Fig. 3 is a vertical sectional view taken on the broken line 3—3 of Fig. 1.

Fig. 4 is a detail view illustrating the adjustable connection between the broiler pan and the movable support therefor.

Fig. 5 is a detail view illustrating the adjustable connection between the oven rack and the movable support therefor.

Referring now to the drawing by reference characters, and wherein like characters designate like parts, R designates generally the stove or range constructed as set forth in the parent application above referred to.

The stove or range R embodies the combined cooking and table-top 10 and the upright body portion 11 supported by suitable legs 12.

The body portion 11 comprises side and rear insulated walls 13 and 14 respectively, and a front downwardly swinging insulated door 15, the body portion further including a horizontal insulated partition 16 defining with the door and walls above referred to an upper broiler compartment B and a low oven compartment O. The broiler compartment B is provided with a suitable burner 17 and the oven O is provided with a suitable burner 18.

Arranged within the broiler compartment B is a broiler pan supporting device comprising a horizontally slidable bar 19 in the form of an inverted T, the bar being formed at its front end with a pan supporting bracket 20, the bracket having a forwardly and upwardly extending arcuate or curvilinear flanged guide member 21, which is adaptable under certain conditions for cooperation with the guide rollers 22 mounted upon the inner end of the arm 23 of a vertically movable broiler pan "pull-out" device 24 constructed and operative as set forth in the parent application above referred to.

The broiler pan 25 is provided upon one end thereof with a rigid bracket 26 and the pan 25 is provided with a pair of openings 27 which detachably receive the hooks 28 of one of a series of vertically disposed notched or recessed portions 29 formed in a pair of parallel vertical flanges 30, preferably integral with the web of the bracket 20. The forward vertical face of the bracket 26 engages the vertical parallel edges of flanges 30 for rigidly supporting the pan 25 in horizontal position in any vertically adjusted position on the bracket 20.

Obviously, the pan 25 may be placed at the desired vertical elevation with respect to the burner 17 by simply tilting the pan upwardly upon its support and then lifting it off and then placing it upon the lower or upper of the vertical series of hooks 28.

In order to guide and provide for horizontal movement of the bar 19, which supports the broiler pan carrying bracket 20, we provide a channel trackway 31 having opposed inwardly directed flanges 32, which overhang the lateral flanges of the T-bar 19 as is clearly indicated in Fig. 3.

The bar 19 at its rear end is provided with anti-friction rollers 33 which move in the channel trackway 31. Journalled in the partition 16 adjacent the forward end thereof and having its periphery lying within the trackway, is an anti-friction roller 34, which with the rollers 33 permit the bar to be moved into and out of the broiler compartment without frictional engagement with stationary parts of the structure.

A very similar arrangement is employed for guiding and supporting an oven rack supporting device 35. Mounted upon the lower face of plate 36 which is disposed slightly below partition 16 and extending centrally thereof in the direction of the depth of the oven O, is a channel trackway 37. The oven rack supporting member comprises a T-shaped bar 38 slidably disposed within the trackway 37 as is clearly shown in Fig. 3.

The slide bar 38, at its rear end, is provided with an anti-friction roller 39 while the trackway 37 at its forward end is provided with a pair of anti-friction rollers 40 for the purpose of allowing the bar to be easily moved into and out of the oven compartment.

The slide bar 38 is provided at its rear end with a depending rigid T-shaped rack carrier 41 which is provided with a vertical series of recesses 42, each in the form of a bayonet slot for the purpose of supporting at the desired elevation within the oven O one or more cooking utensil supporting racks 43.

Each rack at its rear is provided with downward extensions 44, which, when the rack is in any adjusted position on the depending carrier 41, rests against the rear vertical flange 41a thereof and thereby braces the rack so that it is rigidly maintained in horizontal position.

The bar 38 is preferably provided at its forward end with a finger hold 45, whereby it and the rack carrier and racks may be moved forwardly and out of the oven when the door 15 is open.

It may be readily appreciated from the foregoing disclosure that in accordance with the present invention novel cooking vessel supports are provided in connection with a cooking range having superposed oven and broiler compartments separated by a horizontal partition and which compartments are closed by a single door whereby, when the door is opened, the supports may readily be drawn forward out of the compartments in which position cooking vessels may be adjustably placed upon the supports which are thereafter moved rearwardly into the compartments preparatory to closing the door.

While we have disclosed but a single specific embodiment of our invention, same is to be considered as illustrative only, and not restrictive, since the scope of the invention is defined in the subjoined claims.

What we claim and desire to secure by U. S. Letters Patent is:

1. In combination with a range comprising a cooking compartment having a door controlled open end, a cooking vessel support comprising a horizontal channel trackway supported on the lower wall of said compartment and extending in the direction of the depth thereof, a bar slidably supported in said trackway for movement into and out of said compartment, and a vertically disposed and forwardly extending member carried by an end of said bar adjacent said open end and having a vertical series of rearwardly disposed recesses and projections for removably and adjustably supporting a cooking vessel.

2. The structure defined in claim 1, wherein said vertically disposed member comprises a pair of parallel spaced plates, and wherein said recesses and projections are arranged in horizontally disposed pairs in both of said plates for maintaining the cooking vessel in horizontal position.

3. In combination, a horizontally movable bar, a bracket rigid with one end of said bar and having a pair of spaced vertically disposed parallel flanges, vertically spaced hooks on said flanges with those on one flange in horizontal alinement with those on the other flange, a broiler pan having a pair of openings adjacent the front margin thereof for removably receiving any two horizontally alined hooks on said flanges, and a forwardly extending bracket rigid with said pan below the pair of openings and having a face for engaging the edges of said flanges for maintaining the pan in horizontal position.

4. In a cooking range comprising a broiler compartment having an opening in the front end thereof closable by a door; a broiler pan support slidably disposed within the broiler compartment, and means on the support adjacent said door for vertically adjusting and removably supporting a broiler pan.

5. In combination with a range comprising a broiler compartment having a bottom wall and a door controlled open front; a broiler pan support comprising an elongated bar slidably mounted on said bottom wall for movement toward and from said open front, and a bracket carried by said bar at an end thereof adjacent said open front, said bracket having rearwardly directed means for removably and adjustably engaging the front end of a broiler pan within said compartment.

6. In combination with a range comprising a cooking compartment having a door controlled open end, a cooking vessel support comprising a horizontal channel trackway supported on the lower wall of said compartment and extending in the direction of the depth thereof, a bar slidably supported in said trackway for movement into and out of said compartment, and a vertically disposed forwardly extending web at the front end of said bar, said web being formed on its rear edge with a vertical series of pan supporting recesses, and on its front edge with an upwardly curved arcuate T-flanged door-member engaging portion.

JACOB TELLER.
ARTHUR P. SCHULZ.